March 12, 1940.  S. W. THOMPSON  2,193,575
TURF SPIKING TOOL
Filed Aug. 17, 1935  4 Sheets-Sheet 1

S. W. Thompson INVENTOR.
BY
Thomas Howe ATTORNEY.

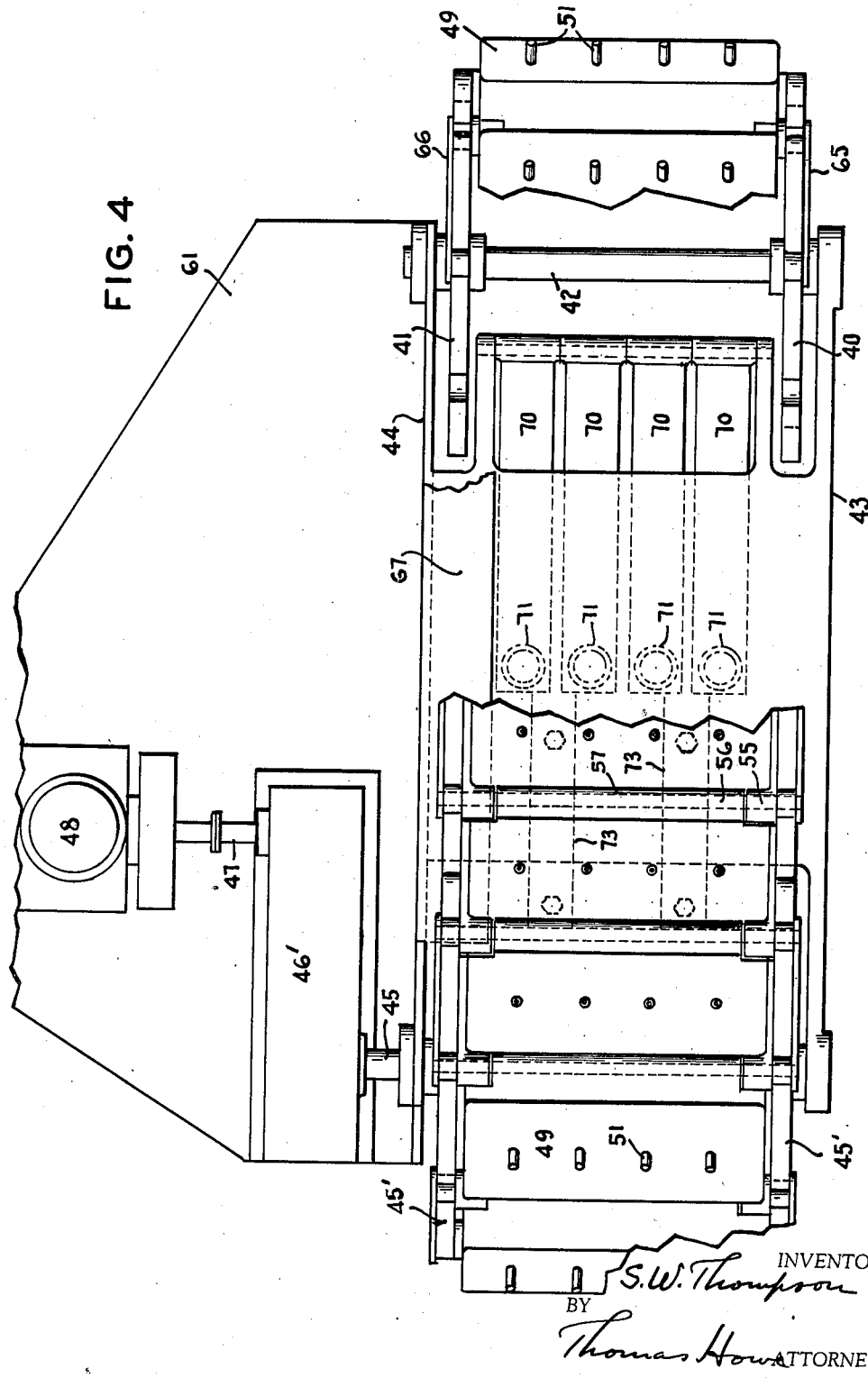

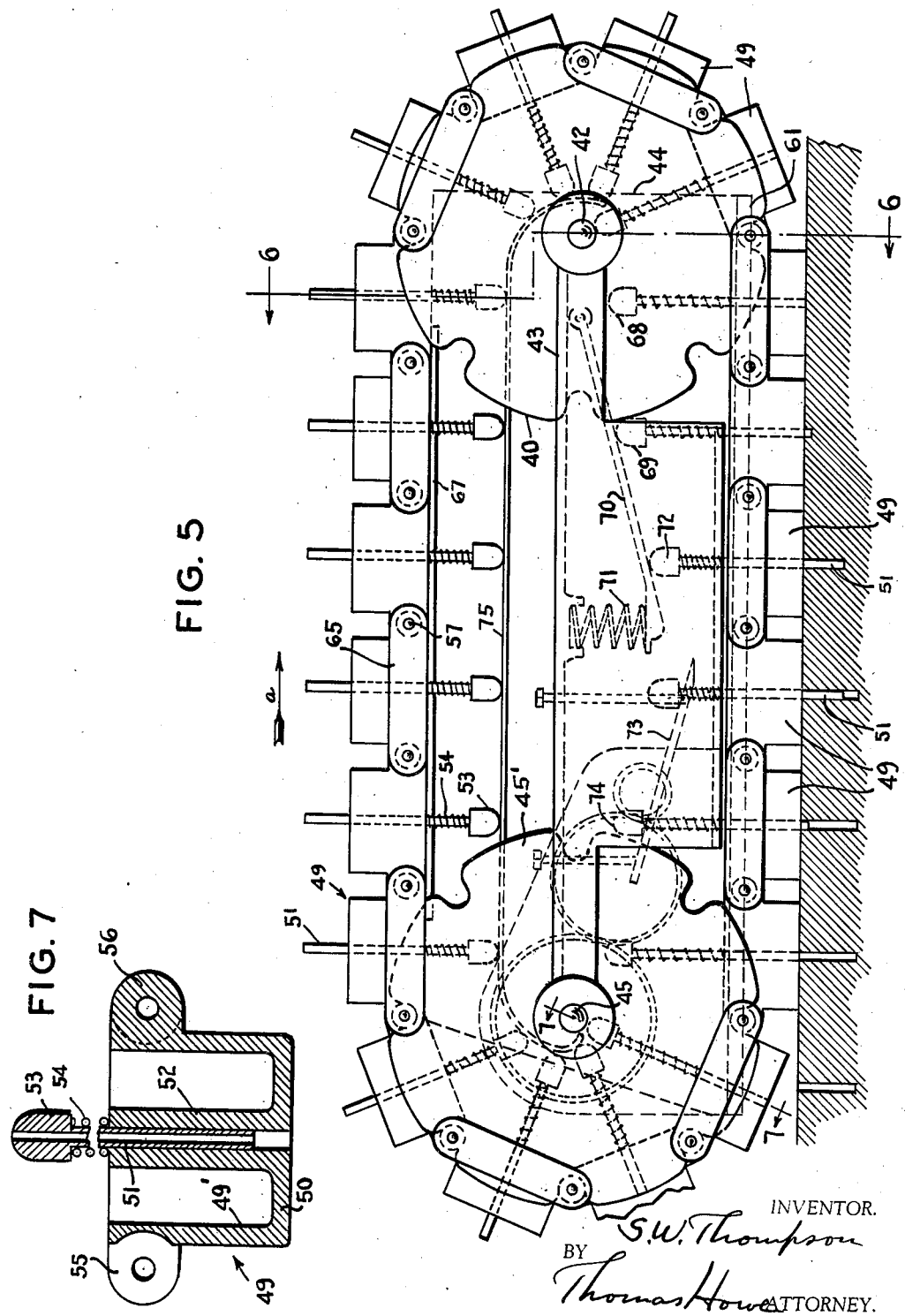

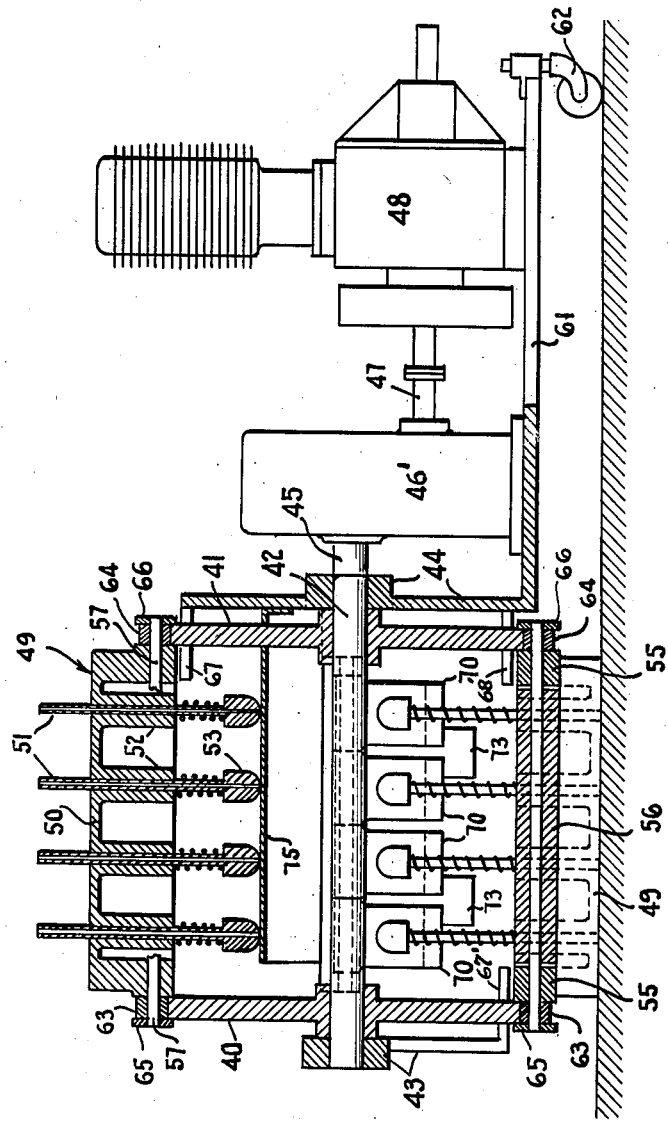

Patented Mar. 12, 1940

2,193,575

UNITED STATES PATENT OFFICE 2,193,575

TURF SPIKING TOOL

Seth Waldo Thompson, Essex Fells, N. J.

Application August 17, 1935, Serial No. 36,633

16 Claims. (Cl. 97—44)

This invention relates to methods and means for what is known as "spiking" turf. Some turf or other ground areas, as for instance the greens in golf courses, cannot be spaded, ploughed or otherwise tilled with corresponding gradual deterioration of the grass. It has been proposed to relieve against this condition, and as a sort of substitute for tilling, that small holes be formed in the turf to a depth of several inches and suitably distributed over the area affected. These holes may be left open when they will provide space into which the surrounding earth may work thereby slightly agitating and lightening the soil, and also rain or surface water of any character may enter the holes and thereby penetrate the soil, the moisture thus reaching a position where it can efficiently operate upon the grass roots. These holes might also be filled with sand which would gradually work into and lighten the surrounding soil, or fertilizer might be introduced into the holes and would thereby be brought into the most efficient relation to the grass roots beneath the soil. Such operation of forming holes in the turf is commonly known as "spiking."

It will be observed that this formation of a number of holes distributed over the turf, such as a golf green, will not interfere with the use of the green for playing purposes, but will, so far as the condition and up-keep of the greens is concerned, be a satisfactory substitute for the usual tilling operations.

It is necessary, however, that in "spiking", the operation should be carried out in such manner as not to tear the turf as otherwise the area in cases requiring levelness and smoothness, such as golf greens, the disturbing of the turf would seriously impair if not destroy the usefulness of the area treated.

The main object of the present invention is to provide means of the character indicated which shall perform the "spiking" with ease, efficiency and speed.

A further object of the invention is to provide means of the character as indicated which shall not injure the turf.

A further object of the invention is to provide means of the character as indicated, the use of which is simple and not laborious to the operator.

A further object of the invention is to provide means of the character described which shall include its own motive means for driving the vehicle and also for operating the excavators.

A further object of the invention is to provide apparatus of the character described mounted upon a vehicle which is propelled and operated by continuously operating motor means.

A further object of the invention is to provide apparatus of the character described comprising "spiking" means mounted upon a vehicle which is continuously propelled.

A further object of the invention is to provide a method of "spiking" with ease, efficiency and speed.

A further object of the invention is to provide a method of "spiking" which shall not injure the turf.

A further object of the invention is to provide a method of "spiking" wherein the "spiking" means is mounted on a vehicle and the operation is performed while the excavators are laterally stationary with regard to the ground.

Other and ancillary objects of the invention will appear hereinafter.

In the accompanying drawings which illustrate the invention—

Fig. 4 is a top plan view of a modified form of apparatus embodying the invention, partly broken away;

Fig. 5 is a side elevation of the apparatus of Fig. 4 viewed from the bottom of Fig. 4;

Fig. 6 is a section on the line 6—6 of Fig. 5; and

Fig. 7 is a section on an enlarged scale on line 7—7 of Fig. 5 from one of the articulated members of which the endless caterpillar tractor member is formed.

Figure 1:
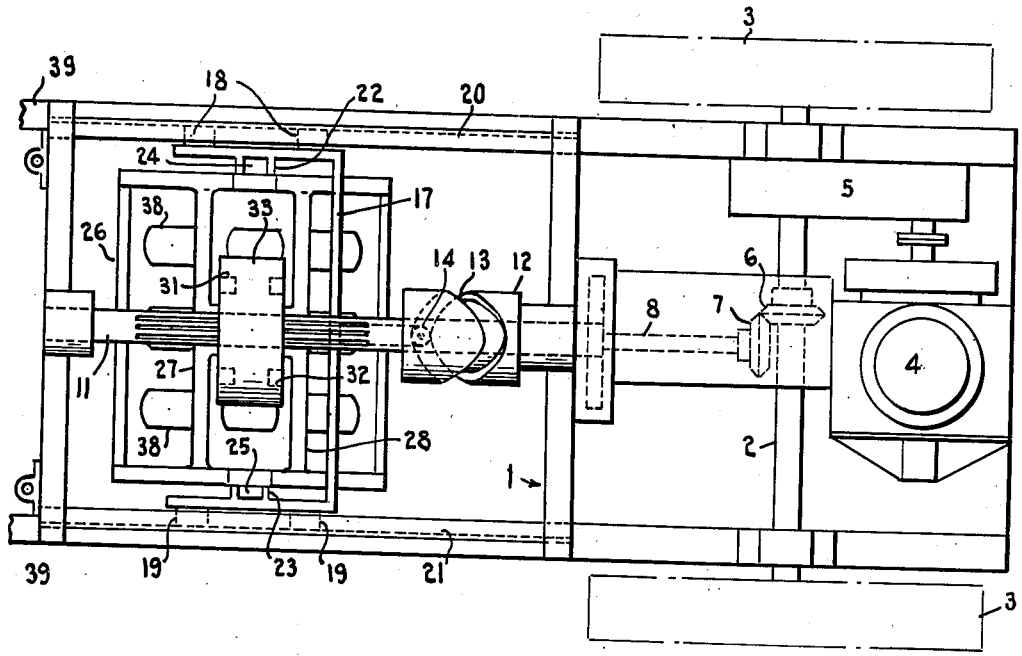
Fig. 1 is a top plan view of "spiking" mechanism embodying the invention.
Figure 2:
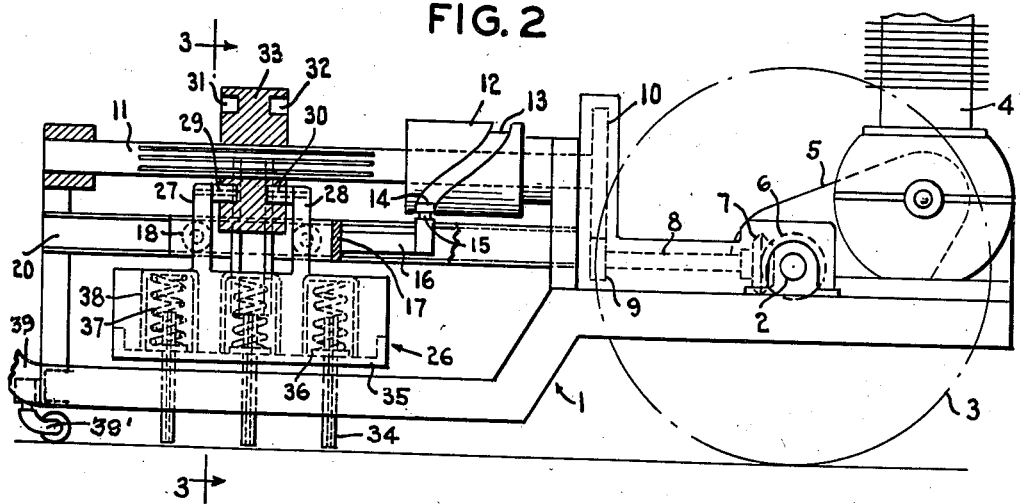
Fig. 2 is a side elevation, partly in central section, of the apparatus of Fig. 1.
Figure 3:
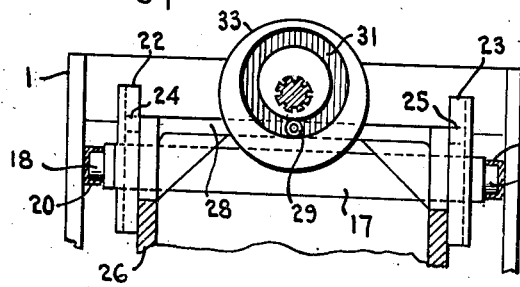
Fig. 3 is a section, partly broken away, on the line 3—3 of Fig. 2.

Referring to the drawings and first to Figs. 1 to 3 inclusive, the apparatus comprises a frame 1 in which is rotatably mounted an axle 2 to which the traction wheels 3 are fixed. The axle 2 is driven from any suitable motor 4, such as an internal combustion engine, mounted upon the vehicle frame and being connected in driving relation to the axle 2 by means of suitable gearing within the case 5.

Fixed upon the axle 2 is a bevel gear 6 meshing with a bevel gear 7 fixed upon the shaft 8. Also fixed upon the shaft 8 is a gear 9 meshing with a gear 10 fixed upon the shaft 11 which is rotatably mounted in the frame. Fixed upon the shaft 11, against both longitudinal and rotative movement, is a cam 12 receiving within its cam groove 13 a roller 14 mounted upon a projection 15 fixed upon an arm 16 which in turn is secured to a yoke 17 having the projections 18 and 19 sliding in longitudinal channels 20 and 21 on the frame 1. The yoke 17 also carries vertical guide channel pieces 22 and 23 within which may vertically slide the projections 24 and 25 fixed in opposite sides of the excavator carrier 26. From the excavator carrier extend arms 27 and 28 having rollers 29 and 30 rotatably mounted at their upper ends and taking into the cam grooves 31 and 32 of the cam 33 which is splined on the shaft 11, that it may slide thereon but may not rotate with relation thereto.

Carried by the excavator carrier are the excavators namely the metal tubes 34 sliding vertically, with an easy fit, in the plate 35 forming the bottom of the excavator carrier. Fixed to each of the tubes 34 is a washer or collar 36 which limits the movement of the tube downward with relation to the carrier. Each of the tubes is normally held downwardly with its collar 36 against the plate 35 of the carrier, by means of a spring 37 bearing against the collar 36 at one end and at the other end bearing against a yoke 38 secured to the carrier.

In the operation of the apparatus the axle and traction wheels are geared to the motor so that the desired rate of forward speed of the apparatus will be realized. It will be observed, however, that at the same time the shaft 11 and the cams 12 and 13 thereon will be rotated, the cam 12 serving to move the excavator carrier longitudinally of the vehicle and the cam 33 serving to vertically move the excavator carrier.

As the excavator carrier is moved downwardly it will force the excavator tubes 34 into the turf or earth, and when the carrier and excavators are moved upwardly the excavated earth will remain in the tubes as they are withdrawn and will be thus carried upwardly above the turf. The excavated earth will ordinarily so remain until the tubes are lowered for a new excavation when the entry of the newly excavated earth will force the previously excavated earth out from the tops of the tubes, whence it will collect upon the plate 35 and any desired disposition may be made of it.

It will be noted that the force tending to drive each of the excavating tubes into the ground is transmitted through a spring which is individual to the tube so that if any one of the tubes strikes a stone or other obstruction the spring can give and the entry of the tube into the earth will be arrested without damage.

If force should be supplied tending to move the excavating tubes longitudinally of the ground while they are inserted therein, either during their insertal or withdrawal, breakage of the tubes or other parts might be caused, or if this did not take place the sod or turf would be intolerably torn. The cams and other gearing are so designed that during the insertion and withdrawal of the excavating tubes 34, the tubes will move rearwardly with relation to the frame of the vehicle at the same rate that the frame of the vehicle moves forwardly with the net result that the tubes do not move longitudinally over the ground but have a dwell or cessation of such movement during their insertion and withdrawal into the turf, so that the disadvantages referred to are avoided. The insertion and withdrawal of the excavating tubes are accomplished by means of the cam 33 which forces the carrier 26 up and down as the cam revolves with the shaft 11, and the cam is so related to the other apparatus that this movement is accomplished while the excavating tubes 34 are longitudinally stationary with relation to the ground as before referred to, the splining of the cam 33 on the shaft 11 permitting the cam to remain longitudinally stationary while being rotatively driven by the shaft.

The insertion and withdrawal of the excavating tubes 34 is accomplished while the rollers 29 and 30 are passing through those portions of the cam grooves 31 and 32 which are above the axis of the shaft 11 in the position as shown in Fig. 3. The remainder of each of these cam grooves is varied only from a circle about the axis of the shaft 11 as is necessary to cause the two parts of the cam groove to merge smoothly into each other. During this latter half of the rotation of the shaft 11, the excavators 34 will be substantially stationary and out of the ground. Any slight variation of the portion of the cam grooves below the axis of the shaft 11 (see Fig. 3) from a circle, for the purpose of merging the parts of the cam groove as stated, will be only sufficient to harmlessly move the excavators 34 to a small extent in a vertical path without causing them to enter the ground.

In the operation of the apparatus the vehicle will move forward and the cam 12 will cause the excavators to move rearwardly upon the vehicle at the same rate that the vehicle moves forwardly whereby the excavators 34 will be laterally stationary with relation to the ground. This takes place during a one-half revolution of the shaft 11 and cam 12. It is during this period of the operation that the excavators are inserted into and withdrawn from the ground, that is operated by the portion of the cam 33 which is above the axis of the shaft 11 (see Fig. 3). During the remainder of the revolution of the cam 12 the excavators 34 will be drawn forwardly of the vehicle, the excavators 34 being meanwhile maintained out of the ground as above explained. It will be apparent that the forward movement of the vehicle in combination with the movement of the excavators thereon as described, will result in the excavators being advanced along the ground to a position over an untreated area, and further movement of the vehicle results in the operation of the excavators to "spike" the turf as described. The amount of this advance and so the distribution of the holes in the soil may be regulated by proportioning the parts to that end as will be obvious.

The apparatus may be steered by suitable handles as 39 secured to the frame of the vehicle in any appropriate manner and at either end or other suitable location. Also one or more rotatable wheeled supports 39' may be provided for supporting the opposite end of the frame from the traction wheels.

Referring now to Figs. 4 to 7 inclusive, the structure therein shown comprises the sprocket wheels 40 and 41 fixed upon the shaft 42. This shaft 42 is rotatably mounted in the side plates 43 and 44. Also rotatably mounted in the side plates 43 and 44 is a shaft 45 connected by gearing in the casing 46' and through a shaft 47 with the internal combustion motor 48. Sprocket wheels 45' are fixed to the shaft 45 similar to the sprocket wheels 40 and 41 on the shaft 42 and respectively in line therewith.

A caterpillar-like member passes over the sprocket wheels 40, 41 and 45' and comprises the members 49 hinged together forming an endless structure serving as a traction member and also a carrier for the excavators.

Each of the members 49 comprises a pan-like structure 49' having a bottom 50 substantially smooth and flat on its under surface which contacts with the ground. Distributed transversely and substantially centrally across the pan-like structure 49' is a row or a series of tubes 51 adapted to be vertically reciprocated to be inserted into and withdrawn from the ground, the earth entering in the tube on the insertion remaining within the tube on its withdrawal and so forming a hole in the earth.

Each of the tubes 51 is adapted to reciprocate vertically with an easy running fit in a boss 52 in the member 49', such boss being elongated so as to provide a considerable bearing surface for the tube 51 and insure its being held in a vertical positon. Each tube 51 has fixed to it a head 53 at its upper end, and between the boss 52 and the head 53 is inserted a spring 54 which tends to draw the tube inwardly with relation to the member 49'. Each of the members 49 also has projecting from its pan-like structure 49' upon one side, the hinge ears 55 and upon the other side the hinge barrel 56 adapted to fit in between the ears 55 of an adjacent member 49.

The adjacent members 49 of the caterpillar structure are secured together by hinge pins 57.

The engine and gear are mounted upon a platform 61 having at its outer end a swivel wheel support or caster 62 and at its other side is supported from the side plate 44.

Each of the hinge pins 57 extends beyond the sprockets 40 and 41 and has rotatably mounted thereon at each end rollers 63 and 64 adapted to engage in the notches of the sprocket wheels 40 and 41, there being retaining strips 65 and 66 fixed to the pin 57 at its outer end, outside the rollers 63 and 64.

The lower course of the caterpillar rests upon the ground with the open sides of the members 49 upward. It will thus appear that as the caterpillar structure is driven by the motor through the sprocket wheels 45' (preferably in the direction of the arrow a) the whole vehicle will be driven forward after the well known operation of caterpillar traction structures.

A shelf 67 on the side plate 44 extends beneath the members 49 of the upper course of the caterpillar structures and prevents sagging of the upper course, the members 49 sliding along upon the shelf 67 if they should sag to such extent as to contact it. Shelves 67' and 68' project from the side plates 43 and 44 respectively and over the lower course of the caterpillar structure so as to prevent upward buckling should there be any such tendency.

With the structure in the position shown in Fig. 5 the transverse row of excavators as shown at 68 will be moved to their uppermost limit of movement under the action of their springs. As the vehicle progresses the said row of excavators will arrive at the position 69 at which they will have contacted inclined cams or guides 70 pivoted in the side plates and forced downwardly with sufficient force by springs 71, there being one of the guides or cams 70 individual to each longitudinal row of excavators. The excavators in the position 69 therefore will have been forced downwardly somewhat into the earth. As the vehicle progresses, the lower course of the caterpillar which is in contact with the ground being stationary, the transverse row of excavators will come to the position 72 when they will have been cammed so as to be inserted still further into the earth, and this insertion will continue until the row of excavators reaches the end of the cams 70.

The cushioning afforded by the springs 71 will afford relief and prevent breakage or distortion of the apparatus if any of the excavators should strike a rock or other difficulty in penetrating the earth.

When the excavators have left the cams 70 and having thus been forced into the earth to the maximum, they will, upon further progress of the vehicle, have the under surfaces of their heads engaged with the withdrawing cams or inclines 73, and, as the vehicle still further progresses the heads of the excavators will travel up the inclines until in the position 74 the excavators, with their carried earth, will be almost entirely removed from the earth and, upon travelling to and beyond the extreme left-hand (Fig. 5) of the cam 73, the particular transverse row of excavators will be entirely removed from the earth and will pass on and about the sprocket wheels 46.

A broad shelf 75 secured to the side frame 44 of a width equal to the transverse extent of the row of excavators, serves to guide them and prevent their dislocation with relation to the caterpillar members 49. As will be seen this shelf 75 sustains the excavators throughout the entire upper course of the caterpillar and prevents them from falling out of the caterpillar members 49 and insures that they will be held in proper position with relation to the other parts of the apparatus.

The members of the caterpillar with their carried excavators having traversed the upper course, they turn down about the sprocket wheels 40 and 41, the excavators being retained in position by the shelf 75 which is curved downwardly at its ends as shown (Fig. 5) and finally the excavators reach the position 68 where they are about to enter upon their insertion into the ground.

It will be apparent from the foregoing that the excavators of the succeeding articulated caterpillar members will be successively inserted into and withdrawn from the ground and that during such insertion and withdrawal the excavators will be laterally stationary with relation to the ground so that the turf is not torn or distorted and that the progress of the vehicle is continuous for as long a period as may be desired. It will be seen that in withdrawing the excavators the plates 50 forming the bottoms of the caterpillar members will strip off any earth or turf tending to adhere to the exteriors of the tubular excavators and will thus prevent the turf from being so lifted upwardly and tearing and injuring the ground.

While the invention has been illustrated in what are considered its best applications it may have other embodiments without departing from its spirit and is not therefore limited to the structures shown in the drawings.

What I claim is:

1. In apparatus of the character as described, the combination with a vehicle adapted to travel along the earth's surface and carry one or more excavators to different places of excavation, of one or more excavators for withdrawing material from the earth mounted thereon and rectilinearly movable to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement, each of said excavators having its parts fixed and immovable with relation to each other.

2. In apparatus of the character as described, the combination with a vehicle adapted to travel along the earth's surface and carry one or more excavators to different places of excavation, of one or more excavators for withdrawing material from the earth mounted thereon and rectilinearly movable to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement, the withdrawing means comprising yielding means for cushioning the drive of said one or more excavators into the ground.

3. In apparatus of the character described, the combination with a vehicle adapted to travel along the earth's surface and carry one or more excavators to different places of excavation, of one or more excavators for withdrawing material from the earth mounted thereon and rectilinearly movable to be inserted and withdrawn from the earth, excavator mounting means on the vehicle movable in the opposite direction to the movement of the vehicle and means for so moving said mounting means to render said one or more excavators stationary with relation to the lateral movement along the surface of the ground and means for inserting and withdrawing said one or more excavators into and from the ground while they are so stationary.

4. In apparatus of the character described, the combination with a vehicle adapted to travel along the earth's surface and carry one or more excavators to different places of excavation, of one or more excavators for withdrawing material from the earth mounted thereon and rectilinearly movable to be inserted and withdrawn from the earth, excavator mounting means on the vehicle movable in the opposite direction to the movement of the vehicle and means for so moving said mounting means to render said one or more excavators stationary with relation to the lateral movement along the surface of the ground, tractive means for the vehicle and mounting means for said one or more excavators so related to said tractive means that said one or more excavators have periods of dwell as regards their lateral movement over the ground and means for inserting and withdrawing said one or more excavators into the earth during a period of dwell only.

5. In apparatus of the character as described, the combination with a vehicle adapted to travel along the earth's surface and carry one or more excavators to different places of excavation, of one or more excavators for withdrawing material from the earth mounted thereon and rectilinearly movable to be inserted into and withdrawn from the ground, there being periods during the operation of the apparatus during which the said one or more excavators are stationary with regard to lateral movement along the surface of the ground and means for inserting and withdrawing said one or more excavators into and from the earth while they are stationary as regards said lateral movement and motive means on said vehicle for driving said vehicle and operating said one or more excavators, each of said excavators having its parts fixed and immovable with relation to each other.

6. In apparatus of the character as described, the combination with a vehicle adapted to travel along the earth's surface and carry one or more excavators to different places of excavation, of one or more excavators mounted thereon and adapted to be inserted into and withdrawn from the ground, there being periods during the operation of the apparatus during which the said one or more excavators are stationary with regard to lateral movement along the surface of the ground, means for inserting and withdrawing said one or more excavators into and from the earth while they are stationary as regards said lateral movement and means for stripping the soil from the exterior of the excavators.

7. In apparatus of the character as described, the combination with a vehicle adapted to travel along the earth's surface and carry one or more excavators to different places of excavation, said vehicle comprising traction means, of one or more excavators for withdrawing material from the earth mounted upon said vehicle and rectilinearly movable to be inserted into and withdrawn from the ground, means for producing periods during the operation of the apparatus during which the said one or more excavators are stationary with regard to lateral movement along the surface of the ground, means for inserting and withdrawing said one or more excavators into and from the earth and means for relating said traction means and said means for inserting and withdrawing said excavators so that said excavators will be inserted in and withdrawn from the earth while they are stationary as regards said lateral movement, each of said excavators having its parts fixed and immovable with relation to each other.

8. In apparatus of the character as described, the combination with a vehicle adapted to travel along the earth's surface and carry one or more excavators to different places of excavation, said vehicle comprising traction means, of one or more excavators for withdrawing material from the earth mounted upon said vehicle and rectilinearly movable to be inserted into and withdrawn from the ground, means for producing periods during the operation of the apparatus during which the said one or more excavators are stationary with regard to lateral movement along the surface of the ground, means for inserting and withdrawing said one or more excavators into and from the earth and means for relating said traction means and said means for inserting and withdrawing said excavators so that said excavators will be inserted in and withdrawn from the earth while they are stationary as regards said lateral movement and motive means on said vehicle for operating said traction means and said excavator-operating means, each of said excavators having its parts fixed and immovable with relation to each other.

9. In apparatus of the character as described, the combination with a vehicle adapted to travel along the earth's surface and carry one or more excavators to different places of excavation, said vehicle comprising traction means, of one or more excavators for withdrawing material from the earth mounted upon said vehicle and rectilinearly movable to be inserted into and withdrawn from the ground, means for producing periods during the operation of the apparatus during which the said one or more excavators are stationary with regard to lateral movement along the surface of the ground, means for inserting and withdrawing said one or more excavators into and from the earth and means for relating said traction means and said means for inserting and withdrawing said excavators so that said excavators will be inserted in and withdrawn from the earth while they are stationary as regards said lateral movement and continuously operating motive means on said vehicle for operating said traction means and said excavator-operating means.

10. In apparatus of the character as described, the combination with a continuously-moving vehicle adapted to travel along the earth's surface and carry one or more excavators to different places of excavation, of one or more excavators for withdrawing material from the earth mounted thereon and rectilinearly movable to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement.

11. In apparatus of the character as described, the combination with a vehicle adapted to travel along the earth's surface and carry one or more excavators to different places of excavation, said vehicle comprising traction means, of one or more excavators for withdrawing material from the earth mounted upon said vehicle and adapted to be inserted into and withdrawn from the ground, means for producing periods during the operation of the apparatus during which the said one or more excavators are stationary with regard to lateral movement along the surface of the ground, means for inserting and withdrawing said one or more excavators into and from the earth and means for relating said traction means and said means for inserting and withdrawing said excavators so that said excavators will be inserted in and withdrawn from the earth while they are stationary as regards said lateral movement and continuously operating motive means on said vehicle for operating said traction means and said excavator-operating means, said vehicle being continuously driven.

12. In apparatus of the character as described, the combination with a vehicle adapted to travel along the earth's surface and carry one or more excavators to different places of excavation, of one or more excavators for withdrawing material for the earth mounted thereon and rectilinearly movable to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement, said vehicle comprising an endless traction means.

13. In apparatus of the character as described, the combination with a vehicle adapted to travel along the earth's surface and carry one or more excavators to different places of excavation, of one or more excavators for withdrawing material from the earth mounted thereon and adapted to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement, said vehicle comprising an endless means upon which said excavators are mounted.

14. In apparatus of the character as described, the combination with a vehicle adapted to travel along the earth's surface and carry one or more excavators to different places of excavation, of one or more excavators for withdrawing material from the earth mounted thereon and adapted to be inserted into and withdrawn from the ground, means for producing periods during the operation of the apparatus during which the said one or more excavators are stationary with regard to lateral movement along the surface of the ground and means for inserting and withdrawing said one or more excavators into and from the earth while they are stationary as regards said lateral movement, said vehicle comprising an endless traction means, and said excavators being mounted upon said endless traction means.

15. A machine for the purpose described including a main frame having main support wheels therefor, a drive shaft carried by the frame, driving means for said shaft also carried by the frame, gearing mechanism connecting said drive shaft to said wheels, a supplemental frame mounted for horizontal movement on the main frame, an auxiliary frame carried on the supplemental frame for vertical movement with respect thereto, a plurality of hollow punches carried by said auxiliary frame and means operatively connected to said drive shaft for moving said auxiliary frame up and down and said supplemental frame horizontally in timed relation to each other and said main frame to force said punches in vertical planes into and out of the ground being treated.

16. A machine for the purpose described including a frame having wheels for supporting a part thereof, means on the frame for moving and steering the machine over the earth, a second part of the frame being carried on and having an independent horizontal movement with respect to the part supported by the wheels, a third part of the frame carried on said second part for vertical reciprocatory motion, a plurality of shell type extruding punches carried on said third part of the frame, means for moving said second part of the frame alternately in the same direction as and in a direction opposite to, and respectively at a greater rate than and at substantially the same rate as, the movement of the entire machine over the earth, and means for actuating said third part of the frame to move the punches downwardly and then upwardly in a vertical direction as said second part moves in said directions respectively, to cause the punches to encompass and withdraw portions of earth.

SETH WALDO THOMPSON.